Nov. 17, 1964     S. MUSSELL     3,157,063
ADJUSTABLE CONTROL MEANS
Filed Nov. 25, 1960     4 Sheets-Sheet 1

INVENTOR
SYDNEY MUSSELL,
Larson and Taylor
ATTORNEYS

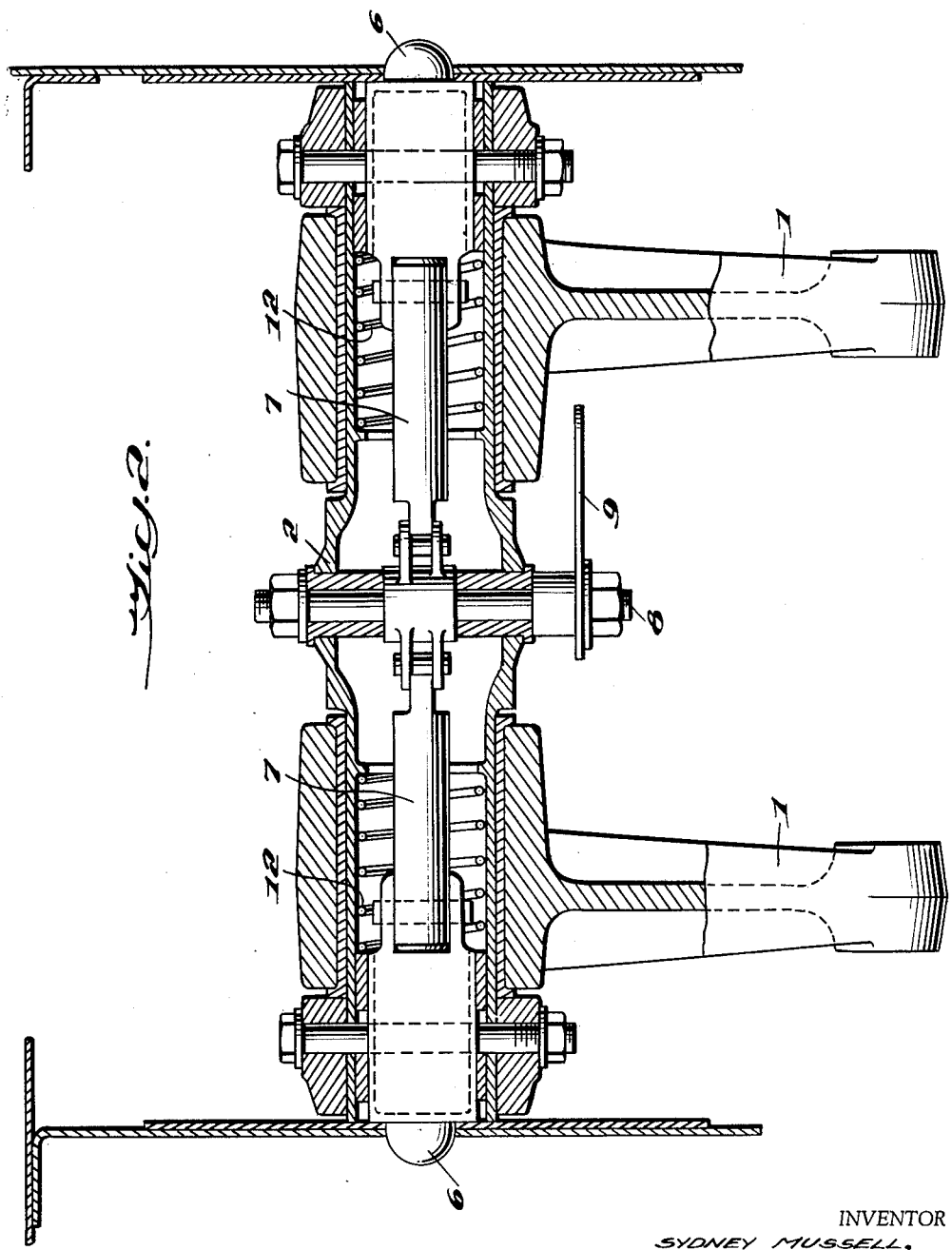

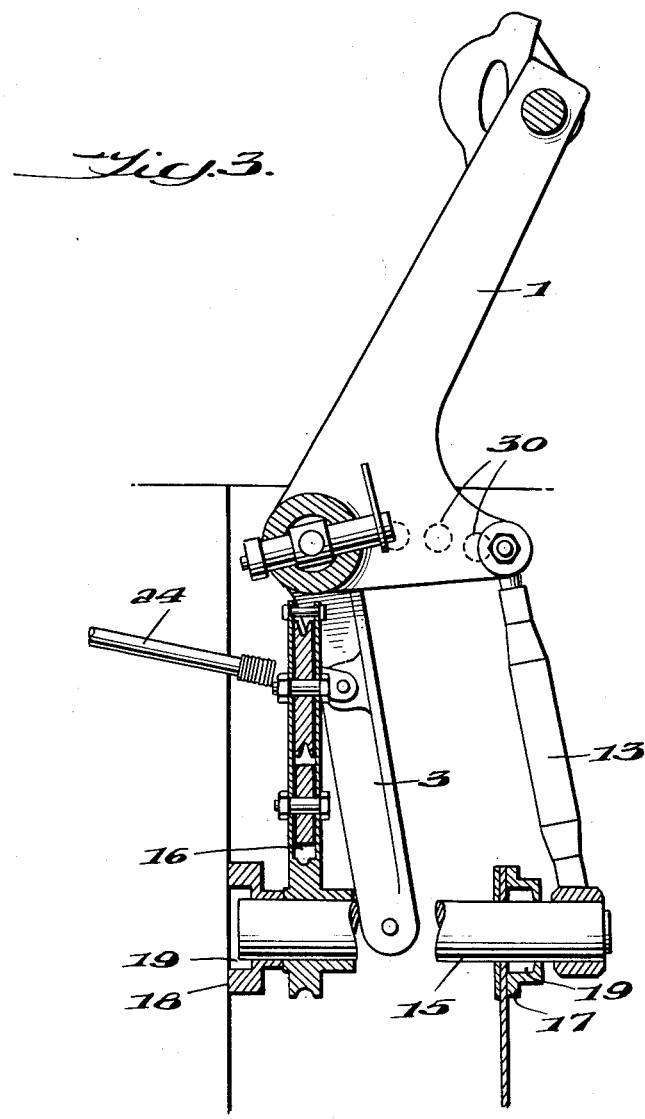

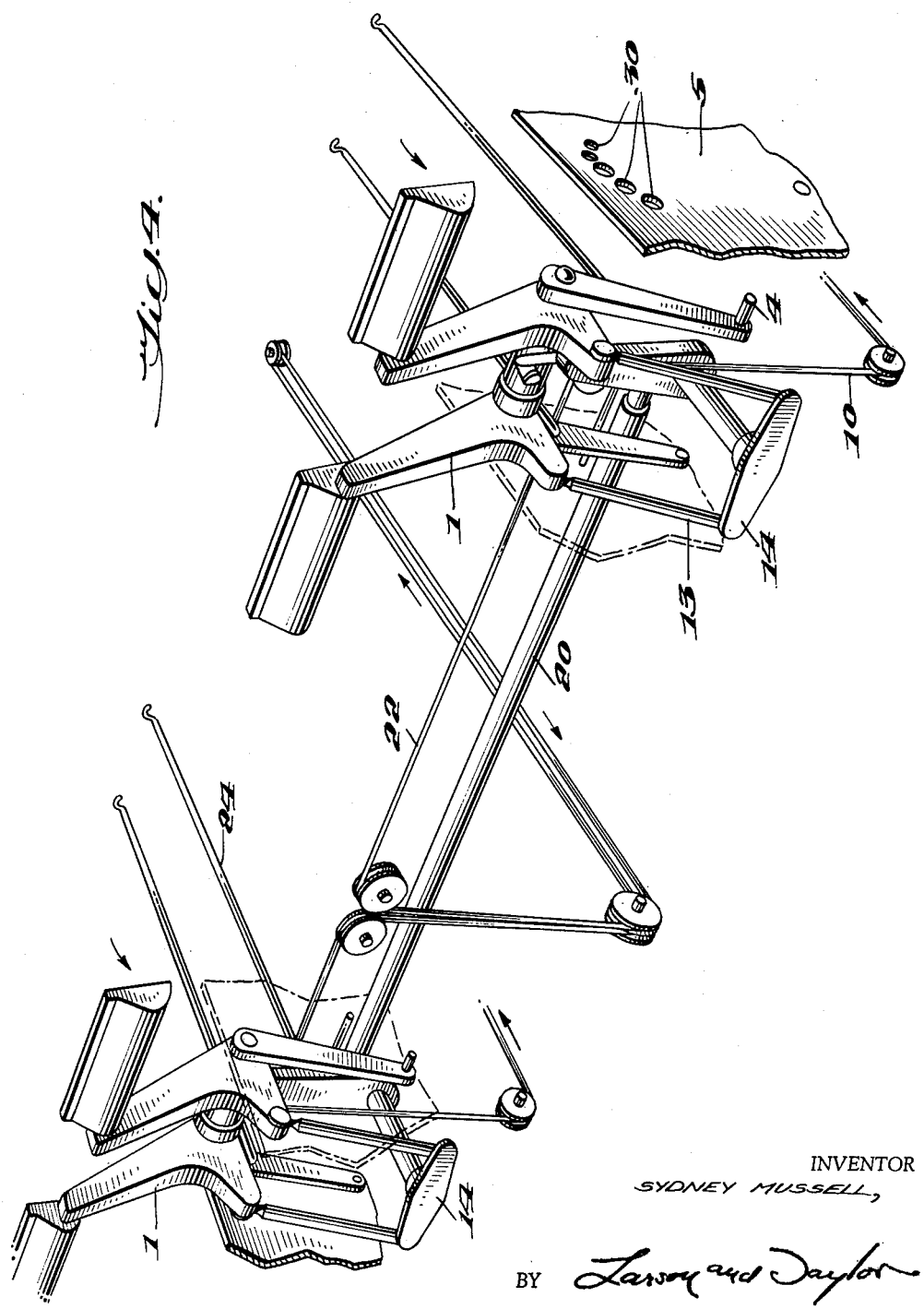

3,157,063
ADJUSTABLE CONTROL MEANS
Sydney Mussell, Bitterne Park, Southampton, England, assignor to Westland Aircraft Limited, Yeovil, England
Filed Nov. 25, 1960, Ser. No. 71,482
Claims priority, application Great Britain Dec. 4, 1959
11 Claims. (Cl. 74—512)

This invention relates to an adjustable pedal structure for operating the controls of a vehicle such as an aircraft in flight or on the ground.

In most aircraft the pilot adjusts his position in relation to the pedal controls by making some manual adjustment to the controls while on the ground or by moving his seat forward or backwards. In some instances, however, this is not possible, as for example, where the rear of the seat is fitted against a bulkhead or where any backward movement of the seat would impede the comfort of the passengers.

It is with the above in mind that this invention was evolved, and it will of course be noted and understood by those skilled in the art that the invention has numerous applications other than the example that follows i.e. the main control column of an aircraft, tanks, motor cars, tractors etc.

It is therefore an object of this invention to provide a means to enable the pilot of an aircraft to adjust the pedals of the pedal controls fore and aft quickly and easily at any desired time, by remote control and to suit his own requirements without releasing his body harness or making any major alterations to his controls.

It is a further object of this invention to provide a pedal control adjustment suitable for a double pedal application requiring the movement of one foot forward relative to the other, such pedal controls being suitable for such purposes as rudder control of fixed wing aircraft or gliders or as pitch control of a tail rotor forming part of the configuration of a helicopter.

The invention consists in pedal control means having fore and aft adjustment means for use on the ground as well as in flight through a substantial range, the adjustment being carried out by remote control by the pilot without the pilot having to release his body harness and not affecting the operation of the controls associated with said pedal control means.

Other objects and advantages will become apparent from the preferred embodiment of the pedal control means as hereinafter described and as shown in the drawings accompanying the specification in which:

FIGURE 2 is a sectional view through a center line of shaft.

FIGURE 3 is a sectional view through a center line of FIGURE 1.

FIGURE 4 is a diagrammatic sketch of the adjustable pedals as provided in a dual control application.

Figure 1:
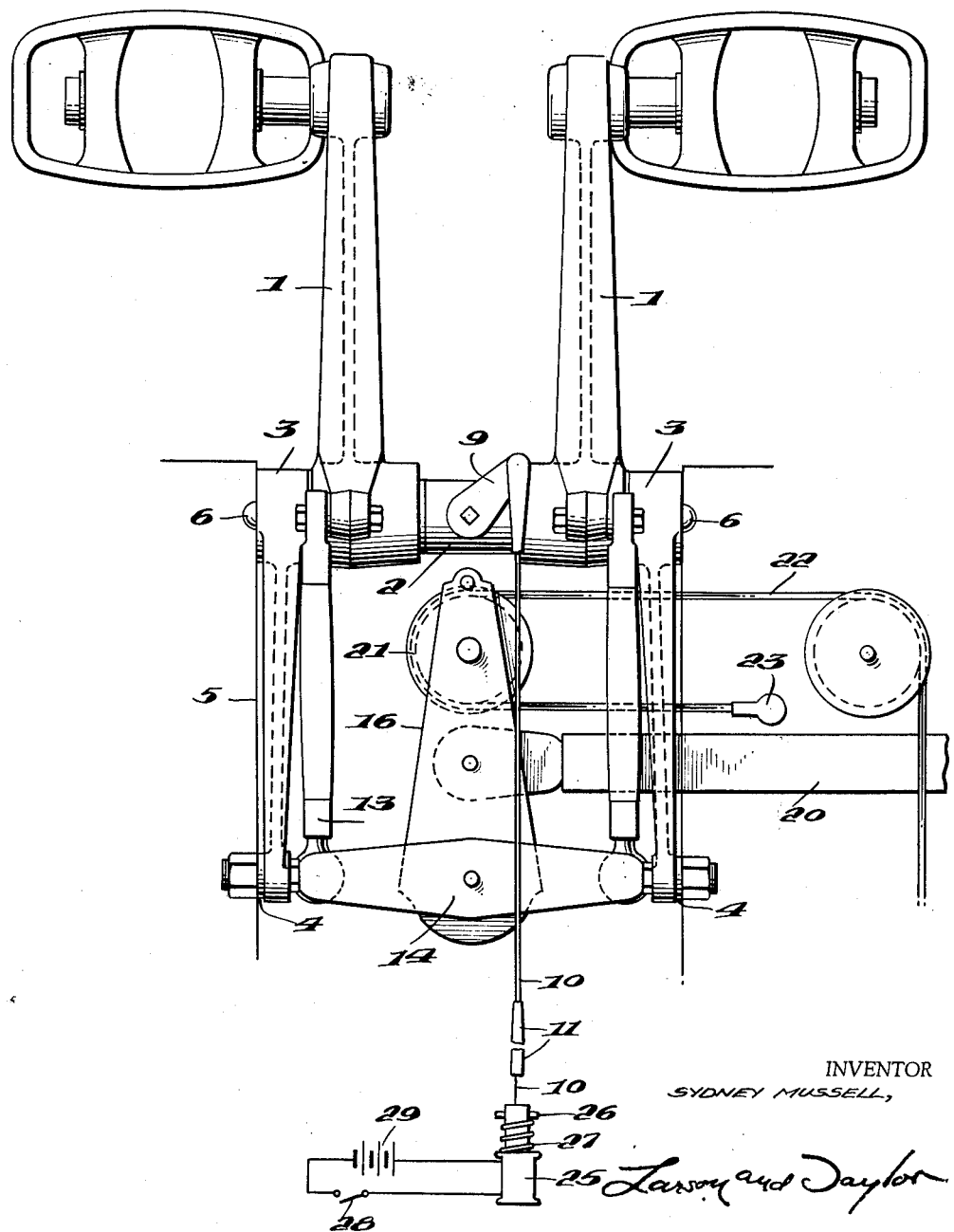
FIGURE 1 is a view of the pedal controls looking aft.

As shown in the drawings, operating pedals 1 are rotatably mounted on a hollow shaft 2 which is transversely disposed between two fixed members 5 and secured at each end to a radius lever arm 3 which is pivotally located at a pivot point 4 on the fixed members 5. The pivot points 4 are each positioned in radial relationship with a series of arcuately disposed detents, or apertures 30 (see FIGURE 4) in their respective fixed members 5 such that the ends of the hollow shaft 2 pass over the detents 30 when constrained by the lever arms, or swinging links, 3 to swing about the pivot points 4.

For location of the hollow shaft 2 in any given position, locating means are provided which will enable the shaft to be located by its ends in one of many preselected positions between the fixed members 5. The locating means comprise a pair of movable locating bearings 6 urged by springs 12 to extend axially outwardly from the hollow shaft 2 and engage any two corresponding detents 30 in the fixed members 5. The locating bearings 6 are made releasable by a pair of links 7 within the hollow shaft 2, each being pivotally attached at one end to one of the bearings 6 and at the other end to a rocker member 31. Member 31 in turn is secured to a spindle 8 passing transversely through the walls at a mid point along the length of the hollow shaft 2. Spindle 8 is rotatable relative to the shaft 2 in a bore defined by the shaft 2 and is retained in the shaft 2 in a manner such as to provide an extension projecting from the shaft 2 in order to accommodate an operating lever 9 which is fixed at right angles to the spindle 8. The lever 9 provides an attaching means for a cable 10 passing through a sheath or conduit 11 to a point conveniently within reach of the hand of a user of the pedals.

In order to translate the movement of the pedals into command of the associated controls, there is provided a mechanical interconnection between the controls and the pedals. The mechanical interconnection comprises an actuating link member 13 pivotally attached at one end and extending downwardly from each pedal 1 and at a position remote from the position at which the pedal is rotatably mounted on the hollow shaft 2. Each actuating link member 13 is pivotally attached at its other end to the end of a lever 14, which is in turn secured at its mid point to a torque shaft 15 which extends rearwardly between the fixed supporting members 5 and is held by bearings 19 housed in rigidly mounted housings 17 and 18. Secured to the torque shaft 15 towards the end remote from the lever 14 and extending upwardly therefrom is a rocker lever 16 bearing a freely mounted pulley 21 at its free end. The pulley 21 lies in the plane of movement of the rocker lever 16 and has, passing around it, a cable 22 of which the free end is anchored at a position 23. Position 23 is in the plane of movement of the arm 16 but beyond its angle of movement. The other end of the cable 22 passes by way of various pulleys to controls or a remote actuator (not shown). On the rocker lever 16, intermediate the torque shaft 15 and pulley 21, is an attachment point for a tie rod 20 which may be fitted to interconnect another such pedal srtucture as hereinbefore described, when dual control applications are required. Tensioning of the adjustable means is provided by resilient means 24, such as a tension spring, attached to both swinging links 3 and secured at an anchor point (not shown) on the vehicle structure in a manner such that the pedals are urged in a direction towards the user.

In operation, should the pilot of an aircraft require an adjustment of his pedal controls, in flight or while on the ground, a lever control, or switch 28, is closed, thereby closing the circuit to energize the solenoid 25 by the power source 29. The armature 26 is then drawn inwardly against the outward bias of compression spring 27. The armature 26, being attached by cable 10 through conduit 11 to operating lever 9, will cause said operating lever 9 to be pivoted. The pivotal movement of the operating lever 9 in turn rotates the operating spindle 8, which, through the linking means 7, 31, causes the bearings 6 to move inwardly against the urging of the spring 12. This will cause the bearings 6 to be withdrawn from their positions in any one of a pair of detents in the fixed members 5. The controls will now be free to swing about pivot point 4, thus enabling the pilot to adjust said controls to his own requirements. On the withdrawal of said bearing means 6 springs 12 are compressed, and when the required adjustment of said controls has been made and the pilot will release said lever control. In doing so springs 12 will expand and force the bearings 6 into new positions in any other pair of detents in the fixed members 5.

In actuation of the vehicle controls, the operator will move one of the pedals 1 forward and the other pedal 1 aft, because of the interconnection of actuating links 13 and lever 14. The rotation of lever 14 causes torque shaft 15 to rotate, and consequently swing the rocker lever 16 to one side or the other. This in turn will cause a rotation of the pulley 21 to pull or slacken the cable 22 so as to affect a movement of the associated vehicle control in a known manner.

While the invention has been described in terms of a preferred embodiment, other forms or variations may of course be practiced and still remain within the spirit of the invention and the scope of the claims.

I claim as my invention:

1. Adjustable pedal means for operating vehicle controls comprising, a pair of spaced fixed members, each having a plurality of detents; a hollow shaft transversely disposed between the fixed members and adapted to be located at its ends in more than one selected position between the fixed members; fore and aft control actuating pedals pivotably mounted on the shaft; means for positioning the shaft comprising a pair of spring loaded bearings in the ends of the shaft to releasably engage a selected pair of the detents; a common movable spindle passing through the shaft and means operatively connected to the spindle for moving the spindle; means operatively linking the bearings to the spindle to release the bearings from the selected pair of detents on movement of the spindle; a pair of swinging lever arms, each lever arm pivotably mounted on said shaft adjacent one of the bearings between the respective fixed member and said pedals, the lever arms being pivotably attached to the fixed members at their ends remote from said shaft; the shaft and pedals being capable of positive repositioning by engagement of the bearings in another selected pair of said detents upon swinging of the shaft and pedals about by said swinging lever arms.

2. Adjustable pedal means for operating vehicle controls as claimed in claim 1, wherein the spindle passes through a transverse bore defined by the shaft substantially midway between said bearings, and the means for moving the spindle includes an operating lever outside the shaft and fixed to the spindle.

3. Adjustable pedal means for operating vehicle controls as claimed in claim 1, and further comprising a centrally disposed torque shaft, an actuating link and lever member connecting the pedals and the torque shaft at a point remote from said spring loaded bearings, and pulley means joining the actuating link and lever member for remotely operating the vehicle controls so that either fore or aft movement of any pedal is translated into rotary movement by said actuating link and lever member to said pulley means.

4. Adjustable pedal means for operating vehicle controls as claimed in claim 1, wherein the outer surface of said shaft provides a bearing means for the pedals and the internal surface provides a housing for the means operatively linking said bearings to said spindle, and the spring loaded bearings include a pair of springs, each of which urge one of said bearings outwardly against the respective fixed member.

5. Adjustable pedal means for operating vehicle controls as claimed in claim 1, wherein the detents are positioned on the fixed members on the line of an arc described by the axis of said shaft when swung about the swinging lever arms and each detent on one of the fixed members has a corresponding detent in the other fixed member whereby said bearings engage the detents simultaneously.

6. An adjustable pedal structure for operating vehicle controls comprising in combination, a pair of fixed members having a plurality of detents, a horizontal hollow shaft adjustably located between the fixed members, pedals pivotably mounted on the shaft, a pair of swinging lever arm members, each pivotably mounted on said shaft at an end thereof and pivotally connected at the other end to one of said fixed members at a point substantially below the horizontal axis of said hollow shaft, retractable spring loaded bearings in each end of said hollow shaft for releasable engagement with any pair of detents in said fixed members, a common movable center spindle passing transversely through said hollow shaft and means including an operating lever on the spindle for moving the spindle, link means disposed within said hollow shaft and operatively connecting said bearings to said spindle to retract the bearings from the detents on movement of the spindle, an actuating link pivotally connected to each of said pedal levers at a point remote from said bearings, a longitudinally disposed torque shaft, a transverse lever located on the torque shaft and pivotally connecting each actuating link to the torque shaft, a rotatable rocker lever connected to the torque shaft, and an operable pulley means for operating vehicle controls, the rocker lever being operatively connected to the pulley means such that fore or aft movement of a pedal is translated into rotary movement of the rocker lever for operating the pulley means.

7. An adjustable pedal structure as claimed is claim 6 and further comprising resilient means to urge said shaft and pedals in the direction of the feet of a vehicle operator when said bearings are released from said detents.

8. An adjustable pedal structure as claimed in claim 6 and further comprising solenoid means operatively connected to said operating lever for actuating said operating lever.

9. A pair of adjustable pedal structures, each as claimed in claim 6, and further comprising a tie rod pivotally connected to each rocker lever, the tie rod transmitting the rotary movement of one of the rocker levers in response to its respective pedal to the other of said rocker levers.

10. An adjustable pedal structure for operating controls on vehicles comprising fore and aft actuating pedals, a pair of fixed members having a plurality of pairs of opposed detents, a hollow shaft transversely disposed between the fixed members, the pedals being pivotably mounted on the shaft, spring loaded bearings in the ends of said shaft releasably engaging any one pair of opposed detents, in said fixed members, an operating spindle passing through said hollow shaft and means for operating the spindle, means linking said spring loaded bearings for releasing the bearings in response to the spindle operating means, the spindle operating means including a lever on said spindle connected to a remote control means within reach of an operator, a pair of swinging lever arm members, each pivotably mounted on said shaft at one end and pivotable about fixed points below said hollow shaft at the other end, the shaft and pedals being movable by pivoting of the swinging lever arm members on releasing of said bearings from said one pair of detents to another position in which said bearings engage another pair of opposed detents.

11. Adjustable pedal structure according to claim 10 wherein said detents are placed in an arc on each of the fixed members described by the axis of said one end of said swinging lever arm members pivoting about said fixed point.

References Cited in the file of this patent

UNITED STATES PATENTS

| | | |
|---|---|---|
| 1,255,220 | Petry | Feb. 5, 1918 |
| 1,414,907 | Vogt | May 2, 1922 |
| 2,277,312 | Fehr | Mar. 24, 1942 |